R. O. HAMMOND.
EGG CARRIER.
APPLICATION FILED JULY 18, 1913.

1,080,276.

Patented Dec. 2, 1913.

Witnesses
Stuart Hilder.
Frances W. Anderson.

Inventor,
Robert O. Hammond,
By E. W. Anderson & Son.
his Attorney.

UNITED STATES PATENT OFFICE.

ROBERT O. HAMMOND, OF FARMINGDALE, NEW YORK, ASSIGNOR, BY MESNE ASSIGNMENTS, TO TYWACANA FARMS POULTRY COMPANY, OF FARMINGDALE, NEW YORK, A CORPORATION OF NEW YORK.

EGG-CARRIER.

1,080,276.  Specification of Letters Patent.  Patented Dec. 2, 1913.

Application filed July 18, 1913. Serial No. 779,796.

*To all whom it may concern:*

Be it known that I, ROBERT O. HAMMOND, a citizen of the United States, resident of Farmingdale, in the county of Nassau and State of New York, have made a certain new and useful Invention in Egg-Carriers; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
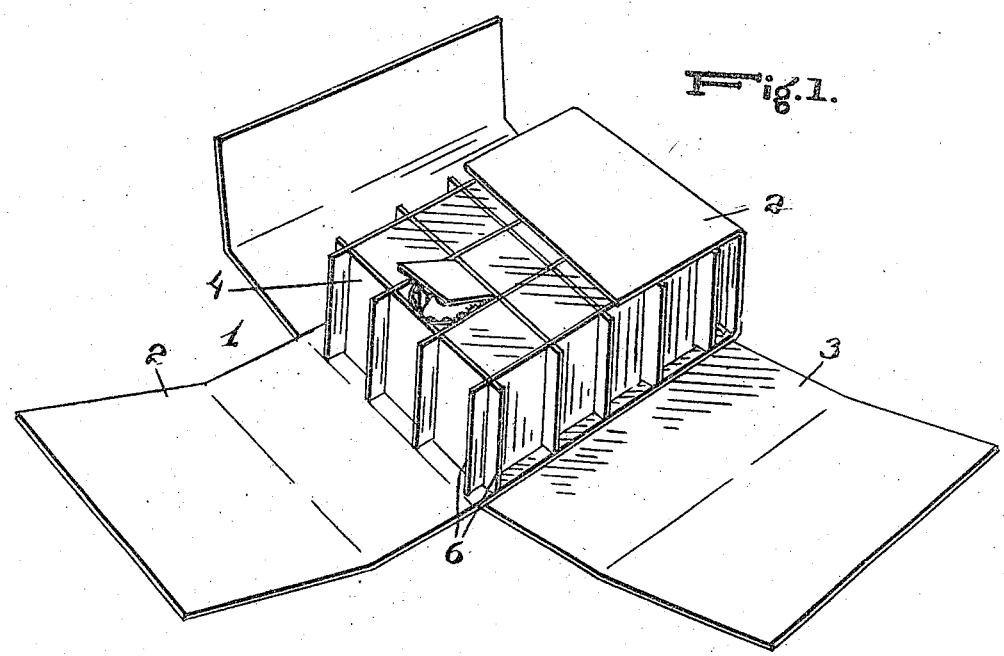
Figures 2, 3:
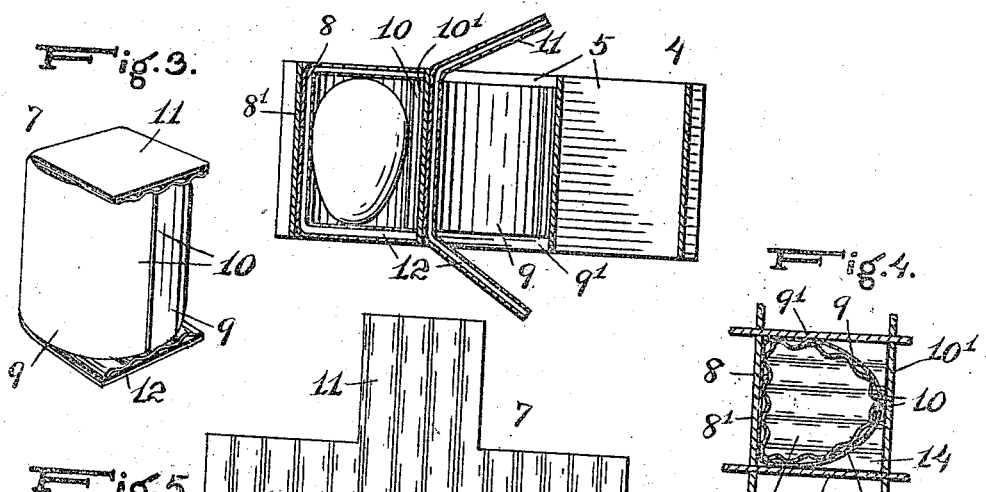
Figure 4:
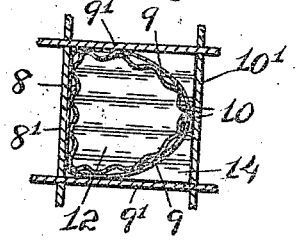
Figure 5:
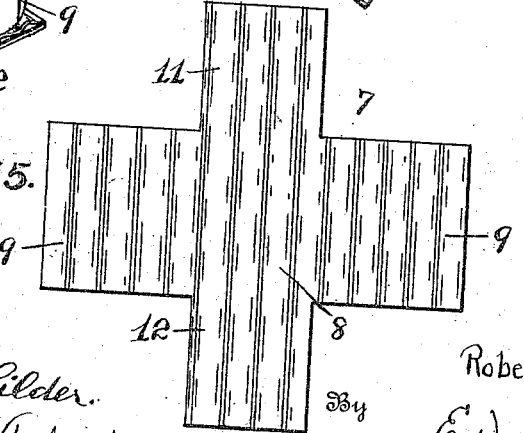

Figure 1 is a perspective view of the invention with parts unfolded. Fig. 2 is a vertical cross section of the inner member showing the egg holders in two compartments, also in cross section, one holder being partly unfolded. Fig. 3 is a detail perspective view of one of the egg holders. Fig. 4 is a detail horizontal cross section of an egg holder within its compartment. Fig. 5 is a detail plan view of a blank for the egg holder.

The invention has relation to egg boxes or carriers, and it consists in the novel construction and combinations of parts as hereinafter set forth.

In the accompanying drawings illustrating the invention, the numeral 1, designates the egg box proper or outer part of the container, consisting usually of rectangular creased blanks 2 and 3 of flat character, folded upon lines at right angles to each other to rectangular form, the outer part 3 closing the open ends of the inner part 2. Fitting within this box is an inner member 4, having rectangular compartments 5, open at top and bottom, said member being usually formed of flat strips 6 slotted or slit vertically half way from opposite sides and engaged together in the customary manner.

Fitting within each rectangular compartment is an egg holder 7, folded from a flat blank, said holder when bent up to form having a flat side 8, bearing against a flat side 8' of the compartment 5; opposite curved sides 9, 9, bearing against the sides 9', 9', of the compartment 5, and having approximated free edges 10, 10, bearing against the side 10' of the compartment 5, and top and bottom flaps 11, and 12 of rectangular form, bent respectively into rather close engagement with the top and bottom of the compartment 5, and acting to maintain the holder in fixed position within the compartment so that said holder may not turn or move in any direction. The sides and top and bottom of the holder having close engagement with the egg within the same, the egg is held against undue movement or shaking.

The curved sides of the egg holder are separated through the major portion of their extent from the sides 9' and 10' of the compartment 5 by spaces 14, allowing said curved sides 9, 9, to yield in an elastic manner and cushion the egg within the holder.

The approximated free edges 10, 10 of the egg holder are not secured together but are free to adjust themselves to the egg to accommodate eggs of varying sizes, being held in position as adjusted by the wall or side 10' of the compartment against which they bear.

What I claim is:—

The combination with an egg box having a plurality of rectangular compartments, of an egg holder for each compartment, consisting of a body having a flat side bearing against a flat side of said compartment, and opposite curved sides bearing against opposite sides of said compartment and having approximated free edges bearing against the other side of the compartment, and a rectangular top and a rectangular bottom having close engagement with the top and bottom of said compartment.

In testimony whereof I affix my signature, in presence of two witnesses.

R. O. HAMMOND.

Witnesses:
  S. C. HILL,
  GEORGE M. ANDERSON.

Copies of this patent may be obtained for five cents each, by addressing the "Commissioner of Patents, Washington, D. C."